United States Patent
Morel-Jean et al.

(10) Patent No.: US 11,046,114 B2
(45) Date of Patent: Jun. 29, 2021

(54) TIRE COMPRISING WORKING LAYERS INCLUDING MONOFILAMENTS FOR PREVENTING CRACKING

(71) Applicant: COMPAGNIE GENERALE DES ETABLISSEMENTS MICHELIN, Clermont-Ferrand (FR)

(72) Inventors: Jacques Morel-Jean, Clermont-Ferrand (FR); Hervé Queraud, Clermont-Ferrand (FR); Olivier Muhlhoff, Clermont-Ferrand (FR); Rémi Bruant, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 213 days.

(21) Appl. No.: 16/099,139

(22) PCT Filed: May 10, 2017

(86) PCT No.: PCT/FR2017/051109
§ 371 (c)(1),
(2) Date: Nov. 5, 2018

(87) PCT Pub. No.: WO2017/194875
PCT Pub. Date: Nov. 16, 2017

(65) Prior Publication Data
US 2020/0307316 A1    Oct. 1, 2020

(30) Foreign Application Priority Data

May 11, 2016    (FR) ..................................... 16/54185

(51) Int. Cl.
*B60C 9/20* (2006.01)
*B60C 9/00* (2006.01)

(52) U.S. Cl.
CPC .......... *B60C 9/2009* (2013.01); *B60C 9/0007* (2013.01); *B60C 9/0064* (2013.01);
(Continued)

(58) Field of Classification Search
CPC ... B60C 9/2009; B60C 9/0007; B60C 9/0064; B60C 2009/2016; B60C 2009/2077
See application file for complete search history.

(56) References Cited

U.S. PATENT DOCUMENTS

| 3,244,215 A |   | 4/1966 | Bridge, Jr. et al. |
| 5,173,137 A | * | 12/1992 | Okihara .............. B60C 15/0027 |
|   |   |   | 152/548 |

(Continued)

FOREIGN PATENT DOCUMENTS

| EP | 0043563 | 1/1982 |
| FR | 2 784 614 | 4/2000 |

(Continued)

OTHER PUBLICATIONS

Gent, Alan Neville and Walter, Joseph D., "Pneumatic Tire" (2006). Department of Mechanical Engineering. Paper 854. pp. 3-4 (Year: 2006).*

*Primary Examiner* — Robert C Dye
*Assistant Examiner* — Jack Edmondson Odom
(74) *Attorney, Agent, or Firm* — Cozen O'Connor

(57) ABSTRACT

Technique to increase the endurance of tires comprising two crossed working layers (41, 42), comprising mutually parallel reinforcing elements (411, 421) forming, with the circumferential direction (XX') of the tire, an angle at least equal to 20° and at most equal to 50°, the reinforcing elements being made up of individual metal threads or monofilaments having a cross section at least equal to 0.20 mm and at most equal to 0.6 mm. The end of the monofilaments comprises flats such that they reduce the shear forces (Continued)

in the rubber compounds of the tire under compressive loading.

7 Claims, 1 Drawing Sheet

(52) U.S. Cl.
CPC .... *B60C 9/2006* (2013.01); *B60C 2009/2016* (2013.01); *B60C 2009/2077* (2013.01)

(56) References Cited

U.S. PATENT DOCUMENTS

| | | | |
|---|---|---|---|
| 5,858,137 A * | 1/1999 | Assaad | B60C 9/0007 |
| | | | 152/451 |
| 2001/0020511 A1 | 9/2001 | Ahouanto et al. | |
| 2016/0193879 A1 * | 7/2016 | Astaix | B60C 9/02 |
| | | | 152/527 |

FOREIGN PATENT DOCUMENTS

| | | |
|---|---|---|
| JP | H03 169718 | 7/1991 |
| JP | 2006 061926 | 3/2006 |
| JP | 2011 168254 | 9/2011 |
| KR | 2008011600 A * | 2/2008 |
| WO | WO 2015/014574 | 2/2015 |
| WO | WO-2015014574 A1 * | 2/2015 ........... B60C 9/0042 |

* cited by examiner

TIRE COMPRISING WORKING LAYERS INCLUDING MONOFILAMENTS FOR PREVENTING CRACKING

RELATED APPLICATIONS

This is a U.S. National Phase Application under 35 USC 371 of International Application PCT/FR2017/051109 filed on May 10, 2017.

This application claims the priority of French application no. 16/54185 filed May 11, 2016, the entire content of which is hereby incorporated by reference.

FIELD OF THE INVENTION

The present invention relates to a tire.

BACKGROUND OF THE INVENTION

Since a tire has a geometry that exhibits symmetry of revolution about an axis of rotation, the geometry of the tire is generally described in a meridian plane containing the axis of rotation of the tire. For a given meridian plane, the radial, axial and circumferential directions denote the directions perpendicular to the axis of rotation of the tire, parallel to the axis of rotation of the tire and perpendicular to the meridian plane, respectively.

In the following text, the expressions "radially on the inside of" and "radially on the outside of" mean "closer to the axis of rotation of the tire, in the radial direction, than" and "further away from the axis of rotation of the tire, in the radial direction, than", respectively. The expressions "axially on the inside of" and "axially on the outside of" mean "closer to the equatorial plane, in the axial direction, than" and "further away from the equatorial plane, in the axial direction, than", respectively. A "radial distance" is a distance with respect to the axis of rotation of the tire and an "axial distance" is a distance with respect to the equatorial plane of the tire. A "radial thickness" is measured in the radial direction and an "axial width" is measured in the axial direction.

A tire comprises a crown comprising a tread that is intended to come into contact with the ground via a tread surface, two beads that are intended to come into contact with a rim, and two sidewalls that connect the crown to the beads. Furthermore, a tire comprises a carcass reinforcement, comprising at least one carcass layer, radially on the inside of the crown and connecting the two beads.

The crown comprises at least one crown reinforcement radially on the inside of the tread. The crown reinforcement comprises at least one working reinforcement comprising at least one working layer made up of mutually parallel reinforcing elements that form, with the circumferential direction, an angle of between 15° and 50°. The crown reinforcement may also comprise a hoop reinforcement comprising at least one hooping layer made up of reinforcing elements that form, with the circumferential direction, an angle of between 0° and 10°, the hoop reinforcement usually, although not necessarily, being radially on the outside of the working layers.

PRIOR ART

In the current context of sustainable development, the saving of resources and therefore of raw materials is one of the industry's key objectives. For tires, one of the avenues of research for achieving this objective is to replace the metal cords usually employed as reinforcing elements in various layers of the crown reinforcement with individual threads or monofilaments as described in document EP 0043563 in which this type of reinforcing element is used with the twofold objective of saving weight and lowering rolling resistance.

These monofilaments are essentially cylinders of cross section S, with smallest dimension d, which are generally circular but possibly ovoid, the ends of which are surfaces the shape of which is dependent on the cutting means.

However, the use of this type of reinforcing element has the disadvantage of causing cracks to appear at the ends of the individual threads. Specifically, the individual threads replace collections of several individual threads the tensile strength of which is higher and the compression strength of which is lower. Because of this, the penetration pressure of the end of a monofilament increases and has a tendency to create cracks which ultimately join together and may lead to tire failure. One solution is to lay the monofilaments in strips so as to position the ends of the monofilaments on different planes perpendicular to the axis of rotation as mentioned in document JP 2011168254. However, this method entails applying in strips which is extremely restrictive from an industrial standpoint and presents problems with endurance. This is because the strips are made with substantially equal pitches but constitute reinforcing layers laid at different diameters, leading to a phenomenon of flapping during running.

SUMMARY OF THE INVENTION

One object of the present invention is to increase the endurance of a tire the reinforcing elements of the working layers of which are made up of monofilaments, by adapting the geometry of the ends of the monofilaments and without generating any phenomenon of flapping.

This object is achieved in accordance with one aspect of the present invention directed to a tire comprising:
  a tread, intended to come into contact with the ground via a tread surface, and a crown reinforcement, radially on the inside of the tread, and comprising a working reinforcement,
  the working reinforcement comprising at least two working layers, each comprising reinforcing elements which are coated in an elastomeric material, mutually parallel and respectively form, with a circumferential direction (XX') of the tire, an angle A at least equal to 20° and at most equal to 50°, in terms of absolute value, and of opposite sign from one layer to the next,
  each working layer comprising at least 100 and at most 200 reinforcing elements per 10-cm unit width of working layer measured perpendicular to the monofilaments,
  each reinforcing element being made up of an individual metal thread or monofilament and comprising a cylindrical portion extended on each side by two end portions,
  the cylindrical portion of each reinforcing element having an axis (WW') and being delimited by a lateral surface $(S_L)$, parallel to the axis (WW'), and two base surfaces $(S_B)$, perpendicular to the axis (WW'), each base surface $(S_B)$ having a smallest characteristic dimension (d) at least equal to 0.20 mm and at most equal to 0.60 mm.
  each end portion comprising an end surface $(S_E)$, having an endpoint (E), positioned at the greatest possible distance $(d_E)$, from the base surface $(S_B)$, at least 80% of the reinforcing elements of each working layer having end portions comprising an end surface ($S_E$) of which all points positioned at a distance ($d_{ME}$) from the endpoint (E) that is at most equal to d/10, where d is the smallest characteristic dimension of the base surface ($S_B$) of the cylindrical portion, are positioned at a distance ($d_{MB}$), measured perpendicular to the base surface ($S_B$), away from the base surface ($S_B$), at most equal to d/25, the monofilament endpoints (E) which are situated on the one same side of a circumferential median plane belong to the one same circumferential plane.

The monofilaments are essentially cylinders of cross section S, which are generally circular but possibly ovoid, with smallest dimension d, which end in two end portions. The cylindrical portion is delimited by two surfaces ($S_B$). The end portions are delimited by a base surface, a lateral surface which, overall, is cylindrical and truncated, and an end surface $S_E$, the shape of which is dependent on the cutting means. Unlike the two base surfaces which are perpendicular to the axis (WW'), the end surfaces $S_E$ are not necessarily planar or perpendicular to the axis (WW'). The axis of the monofilaments (WW') is substantially linear, give or take the curvature of the crown of the tire and the manufacturing-induced deformations of the monofilaments.

One customary means of manufacturing the working layers is to manufacture very long plies of monofilaments in which the main direction of the ply is parallel to the axes of the monofilaments. These plies are referred to as straight-grain plies. These straight-grain plies are then cut at an angle A' such that, after curing, the monofilaments have the desired orientation for the working layer in the tire. These portions are then butted together end to end to form an angled ply which, once assembled and cured, constitutes within the tire a working layer. With this method, the ends of the monofilaments are aligned overall, the working layers are of substantially constant width, and the monofilaments reproduce the angle A' as do their ends which, after the tire has been manufactured, form sharpened points which have an effect of penetrating into the rubber. The laying of the straight-grain ply portions end-to-end may generate offsets of as much as 7 mm between the ends of the monofilaments.

By creating a flat of a minimum length at least equal to one tenth of the smallest dimension d of the cross section S, the penetration pressure is decreased and the endurance of the tire is increased.

This flat may be manufactured using a number of techniques for cutting the straight-grain plies along a suitable line or to a suitable shape:
very high-pressure water jet cutting
laser cutting
cutting with a cutting blade.

The alignment of the ends, the constant width of the working layers, give or take manufacturing variations, have the result that, in the tire, all of the ends of the monofilaments of one and the same layer and on each of the transverse edges of the said layer belong to the one same circumferential plane perpendicular to the axis of rotation of the tire. The circumferential median plane referred to as the "equatorial plane" is the circumferential plane passing through the middle of the tread. This geometric feature makes it possible to solve the problem of flapping and the consequences thereof both in terms of noise performance and in terms of endurance performance.

The manufacturing variations that are commonplace in tire manufacture lead to differences in working layer width of between 2 and 7 mm within the one same tire.

The principle of water-jet cutting involves spraying water at a very high speed of the order of 600 to 900 m/s onto the surface that is to be cut. The water, via a very-high-pressure pump at a pressure of 2000 to 4000 bar, is directed toward an accumulator then expelled through a nozzle towards the surface that is to be cut, in this instance the working ply. This ply is at that moment in the raw state, prior to the conventional step of vulcanizing the tire.

Pure water jet cutting can be used but, for reasons of speed of execution, it is preferable to use a cutting method using a jet of water containing an abrasive.

By way of nonlimiting example, a computerized device controls the path of the water jet on the ply at the time of cutting thereof so as to obtain, on each monofilament end, the claimed flatted shape.

Laser cutting is a method of manufacture that involves cutting the material using a laser thanks to a large amount of energy generated and concentrated on a very small area. The lasers that can be used for performing this cutting are mainly CO2, YAG and fibre lasers.

By way of nonlimiting example, a computerized device controls the path of the laser beam on the ply at the time of cutting thereof so as to obtain, on each monofilament end, the claimed flatted shape.

Cutting by shearing between 2 blades also makes it possible to obtain the claimed geometries. One of the blades may be a rotary cutter. For preference, the profile of the blades is serrated, so as to locally modify the angle of cutting of the monofilaments contained in the straight-grain ply.

It is advantageous for at least 80% of the reinforcing elements of each working layer to have end portions comprising an end surface ($S_E$) of which all points positioned at a distance ($d_{ME}$) from the endpoint (E) that is at most equal to d/10, where d is the smallest characteristic dimension of the base surface ($S_B$) of the cylindrical portion, are positioned at a distance ($d_{MB}$), measured perpendicular to the base surface ($S_B$), of at most equal to d/35. That makes it possible to increase the flat on the surface Se even more and to reduce the extent to which the end of the monofilament penetrates into the rubber compound.

For the same reasons, it is also preferable for at least 80% of the reinforcing elements of each working layer to have end portions comprising an end surface ($S_E$) of which all points positioned at a distance ($d_{ME}$) from the endpoint (E) that is at most equal to d/2, where d is the smallest characteristic dimension of the base surface ($S_B$) of the cylindrical portion, are positioned at a distance ($d_{MB}$), measured perpendicular to the base surface ($S_B$), at most equal to d/20.

One preferred solution is for the cross section S or the base surface ($S_B$) of the cylindrical portion of any reinforcing element to be a circular surface.

For preference, the cross section S or the base surface ($S_B$) of the cylindrical portion of any reinforcing element is a circular surface having a diameter (d) at least equal to 0.30 mm and at most equal to 0.37 mm, which constitute an optimum for balancing the target performance aspects: weight saving and buckling endurance of the reinforcing elements of the working layers.

One preferred solution is for each working layer to comprise reinforcing elements which form, with a circumferential direction (XX') of the tire, an angle, the absolute value of which is at least equal to 22° and at most equal to 35°, which constitute an optimum between tire behaviour and tire endurance performance. The angles of the reinforcing elements of the working layers are measured at the equatorial plane.

It is advantageous for each working layer to comprise at least 120 and at most 180 reinforcing elements per 10-cm unit width of working layer, measured perpendicular to the monofilaments. This makes it possible to guarantee improved endurance of the rubber compounds working in shear between the reinforcing elements and the tension and compression endurance thereof.

The reinforcing elements of the working layers may or may not be rectilinear. They may be preformed, of sinusoidal, zigzag, or wavy shape, or following a spiral. The reinforcing elements of the working layers are made of steel, preferably carbon steel such as those used in cords of the "steel cords" type, although it is of course possible to use other steels, for example stainless steels, or other alloys.

When a carbon steel is used, its carbon content (% by weight of steel) is preferably comprised in a range from 0.8% to 1.2%. The invention is particularly applicable to steels of the very high strength, referred to as "SHT" ("Super High Tensile"), ultra-high strength, referred to as "UHT" ("Ultra High Tensile") or "MT" ("Mega Tensile") steel cord type. The carbon steel reinforcers then have a tensile breaking strength (Rm) preferably higher than 3000 MPa, more preferably higher than 3500 MPa. Their total elongation at break (At), which is the sum of the elastic elongation and the plastic elongation, is preferably greater than 2.0%.

As far as the steel reinforcers are concerned, the measurements of breaking strength, denoted Rm (in MPa), and elongation at break, denoted At (total elongation in %), are taken under tension in accordance with ISO standard 6892 of 1984.

The steel used, whether it is in particular a carbon steel or a stainless steel, may itself be coated with a layer of metal which improves for example the workability of the steel monofilament or the wear properties of the reinforcer and/or of the tire themselves, such as properties of adhesion, corrosion resistance or even resistance to ageing. According to one preferred embodiment, the steel used is covered with a layer of brass (Zn—Cu alloy) or of zinc; it will be recalled that, during the process of manufacturing the wires, the brass or zinc coating makes the wire easier to draw, and makes the wire adhere to the rubber better. However, the reinforcers could be covered with a thin layer of metal other than brass or zinc, having for example the function of improving the corrosion resistance of these threads and/or their adhesion to the rubber, for example a thin layer of Co, Ni, Al, of an alloy of two or more of the Cu, Zn, Al, Ni, Co, Sn compounds.

BRIEF DESCRIPTION OF THE DRAWINGS

The features and other advantages of the invention will be understood better with the aid of FIGS. 1 to 7, the said figures being drawn not to scale but in a simplified manner so as to make it easier to understand the invention.

DETAILED DESCRIPTION OF THE DRAWINGS

Figure 1:
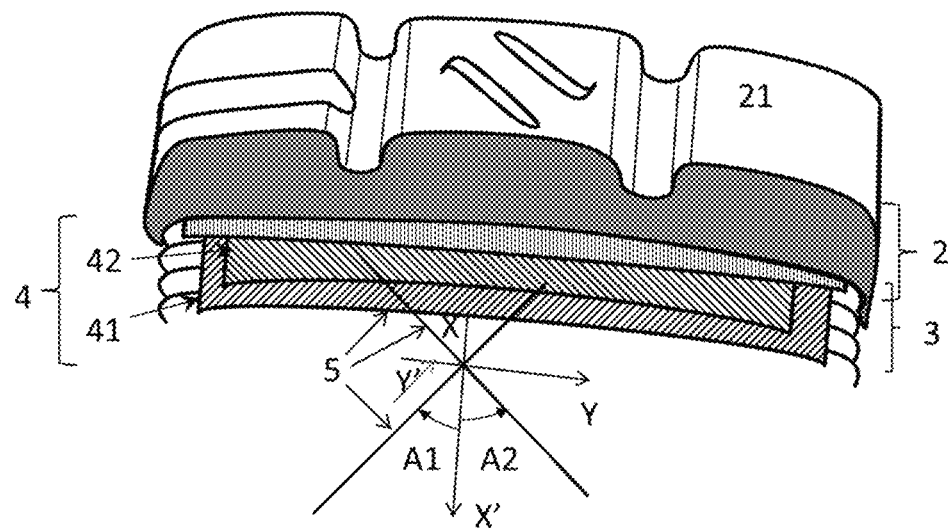
FIG. 1 is a perspective view depicting part of the tire according to an embodiment of the invention, particularly its architecture and its tread.

FIG. 1 depicts a perspective view of a part of the crown of a tire. The tire comprises a tread 2 which is intended to come into contact with the ground via a tread surface 21. The tire further comprises a crown reinforcement 3 comprising a working reinforcement 4. The working reinforcement comprises two working layers 41 and 42 each comprising reinforcing elements (5) which are mutually parallel and respectively form, with a circumferential direction (XX') of the tire, an oriented angle at least equal to 20° and at most equal to 50°, in terms of absolute value, and of opposite sign from one layer to the next.

Figure 2:
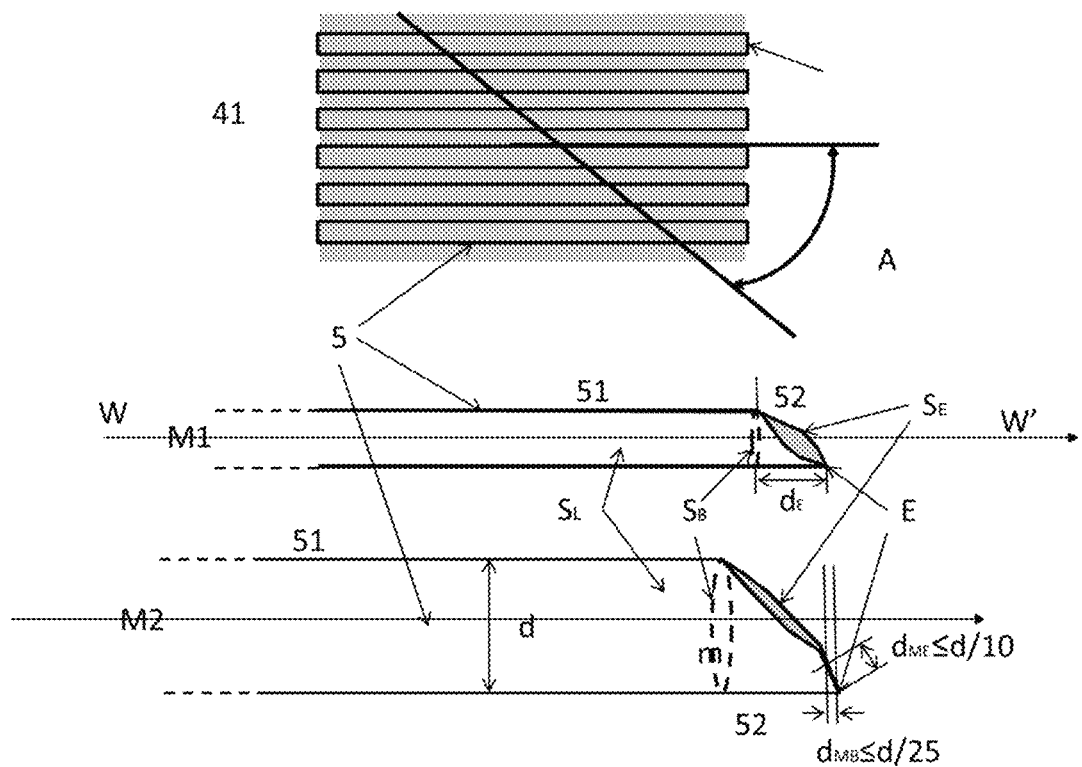
FIG. 2 depicts a sectioned working layer, one monofilament resulting from the operation and one monofilament according to an embodiment of the invention.

FIG. 2 schematically depicts a working layer cut, during manufacture, at an angle A, which is found at the end surface of the monofilament M1 causing the rubber compounds of the tire to be penetrated and to crack. The figure illustrates the cylindrical portion 51 and one of the end portions 52 of the monofilament, the axis of the monofilaments WW', the lateral surface, $S_L$, a base surface $S_B$, an end surface $S_E$, the endpoint E at the longest distance $d_E$ away from the base surface $S_B$. The monofilament M2 according to the invention is cut with the working layer along a line such that the points on the surface $S_E$ which are distant by at most d/10, namely one tenth of the smallest dimension of the cross section S of the monofilament, is distant axially by at most d/25, one twenty-fifth of the smallest dimension D of the cross section S, creating a flat m which, according to our calculations, decreases the penetration pressure of the end of the monofilament on the rubber compounds of the tire by at least a factor of 10.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire comprising:
a tread, adapted to come into contact with the ground via a tread surface, and a crown reinforcement, radially on the inside of the tread, the crown reinforcement comprising a working reinforcement,
the working reinforcement comprising at least two working layers, each working layer comprising reinforcing elements which are coated in an elastomeric material, mutually parallel and respectively form, with a circumferential direction of the tire, an angle A at least equal to 20° and at most equal to 50°, in terms of absolute value, and of opposite sign from one layer to the next, each said reinforcing element of a respective working layer being comprised of an individual metal thread or monofilament, and comprising a cylindrical portion extended on each side by two end portions,
each said working layer comprising at least 100 and at most 200 reinforcing elements per 10-cm unit width of working layer measured perpendicular to the monofilaments,
the cylindrical portion of each said reinforcing element having an axis and being delimited by a lateral surface, parallel to the axis, and two base surfaces, perpendicular to the axis, each said base surface having a smallest characteristic dimension at least equal to 0.20 mm and at most equal to 0.60 mm,
each said end portion comprising an end surface, that is not planar and not perpendicular to the axis, having an endpoint, positioned at the greatest possible distance, from the base surface,
wherein at least 80% of the reinforcing elements of each working layer have end portions cut along a line so as to comprise an end surface of which all points on the end surface which are distant from the endpoint by at most d/10, where d is the smallest characteristic dimension of the base surface of the cylindrical portion, are distant from the endpoint by at most d/25, and wherein the monofilament endpoints which are situated on the same side of a circumferential median plane belong to the same circumferential plane.

2. The tire according to claim 1, wherein the base surface of the cylindrical portion of any said reinforcing element is a circular surface.

3. The tire according to claim 1, wherein the base surface of the cylindrical portion of any said reinforcing element is a circular surface having a diameter at least equal to 0.30 mm and at most equal to 0.37 mm.

4. The tire according to claim 1, wherein each said working layer comprises reinforcing elements which form, with the circumferential direction of the tire, an angle A at least equal to 22° and at most equal to 35° in terms of absolute value.

5. The tire according to claim 1, wherein each said working layer comprises at least 120 and at most 180 reinforcing elements per 10-cm unit width of working layer, measured perpendicular to the monofilaments.

6. The tire according to claim 1, wherein the reinforcing elements of the working layers are comprised of steel.

7. The tire according to claim 1, wherein the reinforcing elements of the working layers are comprised of carbon steel.

* * * * *